US011974967B2

(12) United States Patent
Niikura et al.

(10) Patent No.: US 11,974,967 B2
(45) Date of Patent: May 7, 2024

(54) FIXING DEVICE FOR TRANSPORT SAMPLE FOR USE IN VACUUM HEAT INSULATING DOUBLE WALLED CONTAINER

(71) Applicants: MDAP CO., LTD., Chuo (JP); NIPRO CORPORATION, Osaka (JP)

(72) Inventors: Kazuhiko Niikura, Yamanashi (JP); Shinji Hayakawa, Yamanashi (JP); Masahito Naito, Yamanashi (JP); Saori Horiuchi, Yamanashi (JP); Takanori Sambuichi, Osaka (JP); Ryuuya Yamada, Osaka (JP)

(73) Assignees: MDAP Co., Ltd., Yamanashi (JP); NIPRO Corporation, Osaka (JP)

(*) Notice: Subject to any disclaimer, the term of this patent is extended or adjusted under 35 U.S.C. 154(b) by 0 days.

(21) Appl. No.: 17/788,982

(22) PCT Filed: Dec. 27, 2019

(86) PCT No.: PCT/JP2019/051561
§ 371 (c)(1),
(2) Date: Jun. 24, 2022

(87) PCT Pub. No.: WO2021/131056
PCT Pub. Date: Jul. 1, 2021

(65) Prior Publication Data
US 2023/0041953 A1 Feb. 9, 2023

(51) Int. Cl.
*B65D 81/38* (2006.01)
*A61J 1/16* (2023.01)

(52) U.S. Cl.
CPC ............ *A61J 1/16* (2013.01); *B65D 81/3841* (2013.01)

(58) Field of Classification Search
CPC ......... F25D 3/107; F25D 3/105; B65D 75/56; B65D 85/18; B65D 73/0078; A01N 1/0257
(Continued)

(56) References Cited

U.S. PATENT DOCUMENTS 2,600,902 A * 6/1952 Messerschmidt ....... A47J 45/08 220/753
4,481,779 A 11/1984 Barthel
(Continued)

FOREIGN PATENT DOCUMENTS

DE 10 2006 032 435 1/2008
JP S62-093745 U 6/1987
(Continued)

OTHER PUBLICATIONS

International Search Report issued in International Application No. PCT/JP2019/051561, dated Feb. 18, 2020, 4 pages w/translation.
(Continued)

*Primary Examiner* — King M Chu
(74) *Attorney, Agent, or Firm* — HSML P.C.

(57) ABSTRACT

In a vacuum heat insulating double walled container 1, adsorbent blocks 30 are formed in block, and each of the adsorbent blocks 30 disposed on the peripheral surface of a sample storage container 25 is placed on a partition plate 27. Moreover, an inner container 10 is hang in an outer container 3 using a connecting tube 20 formed of a thin material having an uneven outer peripheral surface, and a heat insulating tube 40 is disposed on the inner surface of the connecting tube 20. Further, as to a workpiece carrier 50 as a fixing device, a carrier guide 52 is in close contact with the heat insulating tube 40, and a plate-like portion 54 and a workpiece storage portion 51 are disposed in a non-contact state with respect to the sample storage container 25. As a
(Continued)

result, it is possible to suppress the amount of heat transferred from the inner container 10 to the outer container 3, and vibration and impact is less likely to applied to a sample in the workpiece storage portion 51 even if an external force such as impact is applied to the vacuum heat insulating double walled container 1.

5 Claims, 15 Drawing Sheets

(58) Field of Classification Search
USPC ............. 206/289, 278; 229/117.26; 294/137, 294/27.1
See application file for complete search history.

(56) References Cited

U.S. PATENT DOCUMENTS 5,189,890 A * 3/1993 Kitayama ............. A61F 9/0008 62/371
2002/0166326 A1 11/2002 Giesy et al.
2010/0000250 A1 1/2010 Sixt
2011/0022532 A1 1/2011 Kriss
2011/0056902 A1 3/2011 Congard
2013/0232998 A1 * 9/2013 Ward .................. A01N 1/0257 62/51.1

FOREIGN PATENT DOCUMENTS

| | | |
|---|---|---|
| JP | H04-000172 | 1/1992 |
| JP | 2005-156136 | 6/2005 |
| JP | 2007-271279 | 10/2007 |
| JP | 2008-285181 | 11/2008 |
| JP | 2009-543082 | 12/2009 |
| JP | 2010-522863 | 7/2010 |
| JP | 2015-224211 | 12/2015 |
| JP | 2017-138244 | 8/2017 |
| JP | 2017-165487 | 9/2017 |
| JP | 2018-194359 | 12/2018 |
| JP | 2019-170207 | 10/2019 |

OTHER PUBLICATIONS

Extended European Search Report issued in corresponding European Patent Application No. 19957994.7, dated Jul. 31, 2023, 10 pages.

* cited by examiner

FIXING DEVICE FOR TRANSPORT SAMPLE FOR USE IN VACUUM HEAT INSULATING DOUBLE WALLED CONTAINER

TECHNICAL FIELD

The present invention relates to a fixing device for a sample to be transported, for use in a vacuum heat insulating double walled container, which can be used for a container for transporting a sample in a frozen state or at a temperature below freezing point.

BACKGROUND ART

Conventionally, various containers have been used as containers for transporting a sample in a frozen state or at a temperature below freezing point. As containers of this type, a biological sample transporting container (see Patent Literature 1), a cryopreservation/transportation container (see Patent Literature 2), and the like, have been proposed. Further, as configurations of a fixing device for storing and holding a sample in a container of this type, a cryopreservation container (see Patent Literature 3), a non-cryopreservation transporting apparatus for a biological structure (see Patent Literature 4), and the like, have been proposed.

In the invention described in Patent Literature 1, as shown in FIG. 11, a stainless steel container main body 66 having a vacuum heat insulating structure is used, and a sample container fixture 63 and an cryogenic liquefied gas adsorbing/holding material 61 are provided in the container main body 66 through a content fixture 64. A plurality of sample container holding holes (not shown) for holding a sample container 62 is formed in the sample container fixture 63, the holding holes being through holes in the vertical direction of the container main body. The outer shape of the sample container fixture 63 is formed to be in the same shape as the horizontal cross-sectional shape of the container main body 66.

The plurality of sample container holding holes (not shown) for holding the sample container 62 is through holes in the vertical direction of the container main body 63. An opening 65 of the container main body 66 with an open upper end can be opened and closed by a screwed lid 67. In this invention, a sample is directly stored in the sample container 62.

In the invention described in Patent Literature 2, as shown in FIG. 12, a heat insulating container 70 having a double-walled vacuum structure that includes an outer wall 70*a* and an inner wall 70*b* is used. A storage object inlet/outlet 73 is formed at the upper part of the heat insulating container 70. The storage object inlet/outlet 73 is provided with an openable lid (not shown). The heat insulating container 70 has a circular cross-sectional shape, and the peripheral wall of the heat insulating container 70 has a vacuum structure surrounded by the outer wall 70*a* and the inner wall 70*b*.

A cavity is formed inside the heat insulating container 70 (an inner side of the inner wall 70*b*), and a storage portion 71 for storing a storage object such as pharmaceuticals or the like, is provided in the cavity. Sloshing suppressing plates 72 are stood from the outer peripheral surface of a plate-like member 74. The sloshing suppressing plate 72 is disposed horizontally between the storage portion 71 and the inner wall 70*b* of the heat insulating container 70 to suppress the sloshing of liquid nitrogen stored in the space between the storage portion 71 and the inner wall 70*b* of the heat insulating container 70.

The invention described in Patent Literature 3 is provided with, as shown in FIG. 13, a container main body 81 for storing a low-temperature liquefied gas, a cap 82 that is formed of a plurality of insertion holes 86 being through the cap in the vertical direction and that is for closing an opening of the container main body 81, a sheath tube 84 inserted into the insertion hole 86 of the cap 82, and an ampoule accommodating device 83 stored in the sheath tube 84 so as to be inserted therethrough.

As shown in FIG. 13, a plurality of gas permeation holes is formed in each of the sheath tubes 84. As shown in FIG. 14, the ampoule accommodating device 83 inserted into each sheath tube 84 includes a support column 87 below a handle portion 89 through a heat insulating portion 88, and a plurality of ampoule accommodating portions 90 attached to the support column 87 arranged in the vertical direction.

The invention described in Patent Literature 4 is provided with, as shown in FIG. 15, a pressure holding vessel 97 configured to enclose a biological structure 95 together with a liquid 96, and a cooling unit configured to generate or increase an internal pressure without freezing the liquid 96 by cooling the pressure holding vessel 97 to 0° C. or lower. The cooling unit is configured to cool the periphery of the pressure holding vessel 97 by a liquid in the case of FIG. 15. The biological structure 95 is suspended in the pressure holding vessel 97 by a biological structure holder 98 configured using a hanging cord or a net.

CITATION LIST

Patent Literature

Patent Literature 1: JP 2017-165487 A
Patent Literature 2: JP 2017-138244 A
Patent Literature 3: JP 2008-285181 A
Patent Literature 4: JP 2015-224211 A

SUMMARY OF INVENTION

Technical Problem

In the biological sample transporting container described in Patent Literature 1, a space between the upper part of the storage portion for storing the sample container 62 and the lid 67 is configured as a space portion, and the vaporized cryogenic liquefied gas flows out to the outside through a gap formed by a recess 68 for venting. Therefore, there is a problem that a concentration of the cryogenic liquefied gas that has been adsorbed by the cryogenic liquefied gas adsorption holding agent 61 decreases over time, resulting in shortening of a low temperature holding time.

In addition, since the sample is directly contained in the sample container 62, when the container main body 63 vibrates, the sample collides with the inner wall of the sample container 62. Also, since the sample is stored in the container main body 63 in a state of being frozen together with the sample container 62, the degree of freedom in handling the sample is lowered. In addition, since the upper end portion side from the middle portion of the sample container 62 is held by the sample container fixture 63 made of a resin material such as foamed polyethylene or polyurethane, or the like, the upper end portion side from the middle portion of the sample container 62 cannot be directly cooled with the cryogenic low-temperature liquefied gas.

In the cryopreservation/transportation container described in Patent Literature 2, since the liquid nitrogen is stored as it is in the space between the storage portion 71 and the inner wall 70*b* of the heat insulating container 70, it is necessary to suppress the sloshing of the liquid nitrogen caused by an external force applied from the outside during transportation. In addition, as the vaporization of the liquid nitrogen progresses, the liquid level of the liquid nitrogen facing the sloshing suppressing plate 72 decreases, and the sloshing becomes severe as the vaporization of the liquid nitrogen progresses. Then, it becomes difficult to suppress severe sloshing by the suppressing plate 72.

If the liquid nitrogen sloshing behavior occurs, and if the natural frequency of the sloshing behavior meets the natural frequency of the plate-like member 74 or the natural frequency of the heat insulating container 70 or the like, a force that greatly moves the heat insulating container 70 itself on a placement table or the like will be generated. Since the sample is stored in the storage portion 71, when the liquid nitrogen sloshing behavior occurs, there is a risk that the sample collides with the inner wall of the storage portion 71 and is damaged.

In the invention described in Patent Literature 3, when the container main body 81 vibrates by an external force, the sheath tube 84 also vibrates, and the ampoule accommodating device 83 stored in the sheath tube 84 also vibrates together with the sheath tube 84. Therefore, the ampoule stored in the ampoule accommodating portion 90 will also be affected by the vibration.

In the invention described in Patent Literature 4, the biological structure 95 is suspended by the biological structure holder 98 configured using a hanging cord or a net, and is immersed in the liquid 96. In addition, the pressure holding vessel 97 is disposed in a state of being immersed in a cooling liquid in a cooling unit provided in a portable transporter. Therefore, when the portable transporter vibrates by an external force, the biological structure 95 vibrates in the pressure holding vessel 97. Further, depending on the natural frequency of the cooling liquid in the portable transporter or the natural frequency of the liquid in the pressure holding vessel 97, the biological structure 95 is subjected to a large pendulum motion by the biological structure holder 98.

With the foregoing in mind, it is an objective of the present invention to provide a fixing device for a sample to be transported, for use in a vacuum heat insulating double walled container, which can solve the aforementioned problems, can efficiently and effectively transport a stored sample in a frozen state or at a temperature below freezing point, and can prevent an influence of vibration of the vacuum heat insulating double walled container from affecting the sample even if the vacuum heat insulating double walled container storing the sample vibrates.

Solution to Problem

In order to achieve the above objective, the problem of the present invention can be solved by the fixing device for a sample to be transported, for use in a vacuum heat insulating double walled container according to the claimed invention. That is, the present invention provides a fixing device for a sample to be transported, for use in a vacuum heat insulating double walled container that includes an outer container and an inner container disposed in the outer container in a separated state, a sealed space between the outer container and the inner container being vacuum, where the vacuum heat insulating double walled container further includes a connecting tube configured to connect and fix an opening edge of an inner lid, which has an opening at a central portion and is fixed to the inner container, and an opening edge of an outer lid, which has an opening at a central portion and is fixed to the outer container, the fixing device including:

a lid detachably disposed with respect to the opening of the outer container and configured to cover the opening to prevent air from entering an inside of the inner container;

a carrier guide disposed on a lower surface of the lid;

a plate-like portion extended from a lower end portion of the carrier guide and having a rectangular cross-section; and a workpiece storage portion disposed on a lower end of the plate-like portion, wherein when the fixing device is fitted and fixed in the vacuum heat insulating double walled container, an outer peripheral surface of the carrier guide is configured to have a shape that reduces a volume of a gas phase part in an upper part of a storage container.

Advantageous Effects of Invention

In the vacuum heat insulating double walled container according to the present invention, since the inner container and the outer container are supported and connected by a connecting tube, the conduction of heat transferred from the inner container to the outer container through the connecting tube becomes slow. In addition, since a space between the inner container and the outer container is set to be vacuum, the temperature rise in the inner container becomes slow. If the outer peripheral surface of the connecting tube is formed in an uneven shape, it is possible to improve the strength of the connecting tube in the longitudinal direction even if the connecting tube is made with a thin wall.

Further, even if the vacuum heat insulating double walled container vibrates, it is possible to suppress transmission of the vibration to the workpiece storage portion by fitting the carrier guide of the fixing device into the heat insulating tube. Moreover, even if the lid or the carrier guide vibrates together with the vacuum heat insulating double walled container due to vibration of the vacuum heat insulating double walled container, since the plate-like portion has a rectangular cross-section, the workpiece storage portion does not freely vibrate due to the vibration. Furthermore, since the plate-like portion and the workpiece storage portion are disposed in a non-contacting state with respect to the inner peripheral surface of the heat insulating tube and the storage container, the workpiece storage portion does not collide with the storage container due to the vibration of the vacuum heat insulating double walled container.

DESCRIPTION OF EMBODIMENTS

Hereinafter, embodiments of the present invention will be described in detail with reference to the drawings. A fixing device for a sample to be transported, for use in a vacuum heat insulating double walled container according to the present invention is not limited to the configuration described below, and various modifications are possible, even having a configuration other than the configuration shown in the following examples, as long as the fixing device satisfies the technical idea of the present invention and can solve the problem of the present invention.

EMBODIMENT

[Configuration of Outer Container, Inner Container, and Connecting Tube]

Figure 1:
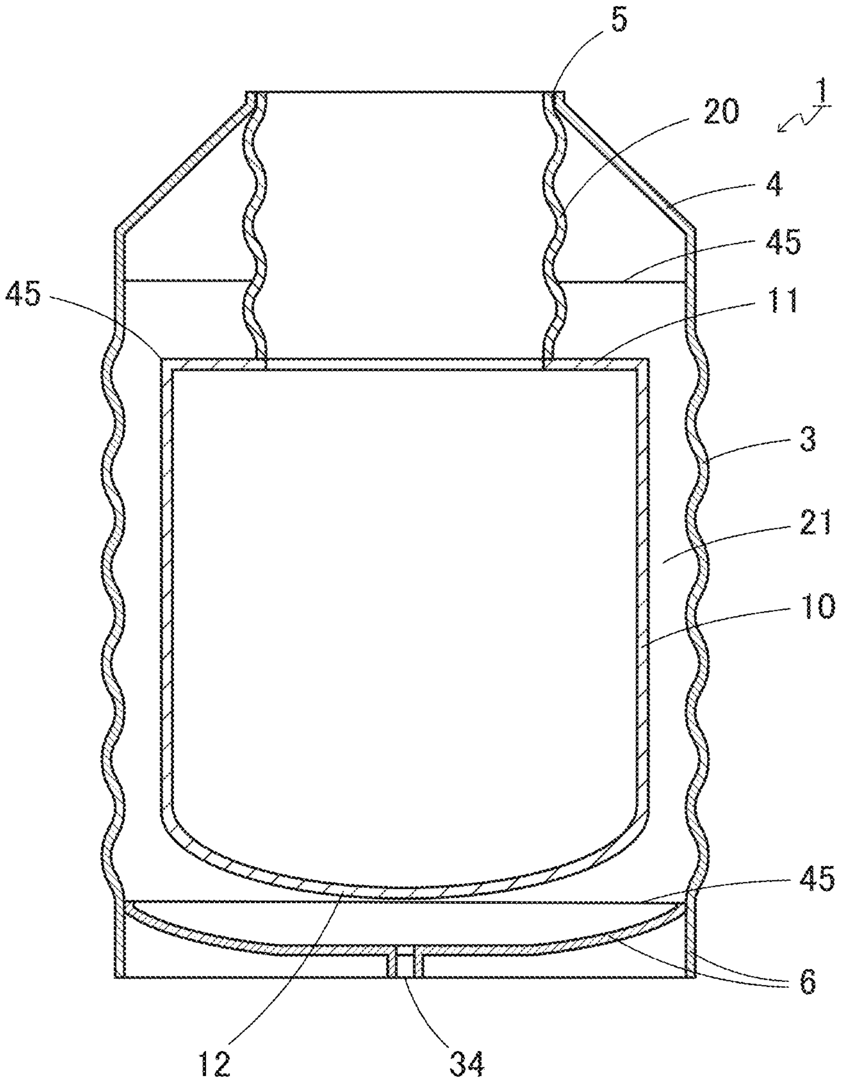
FIG. 1 is a longitudinal cross-sectional view of a vacuum heat insulating double walled container. (embodiment)
Figure 2:
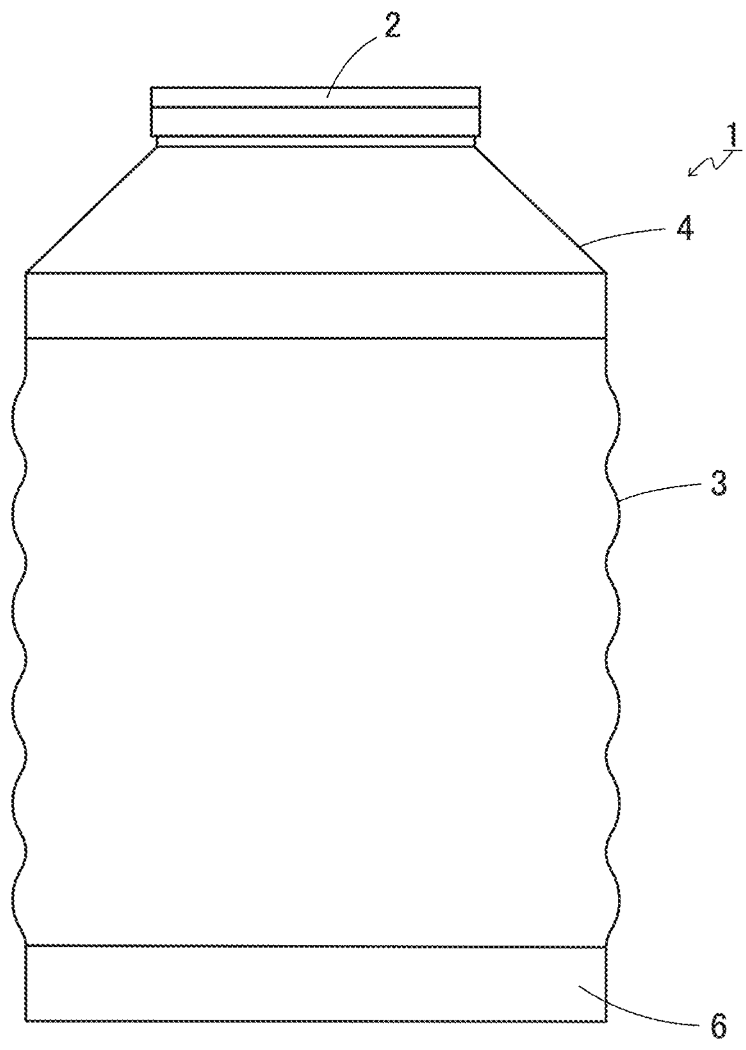
FIG. 2 is a front view of a vacuum heat insulating double walled container. (embodiment)
Figure 3:
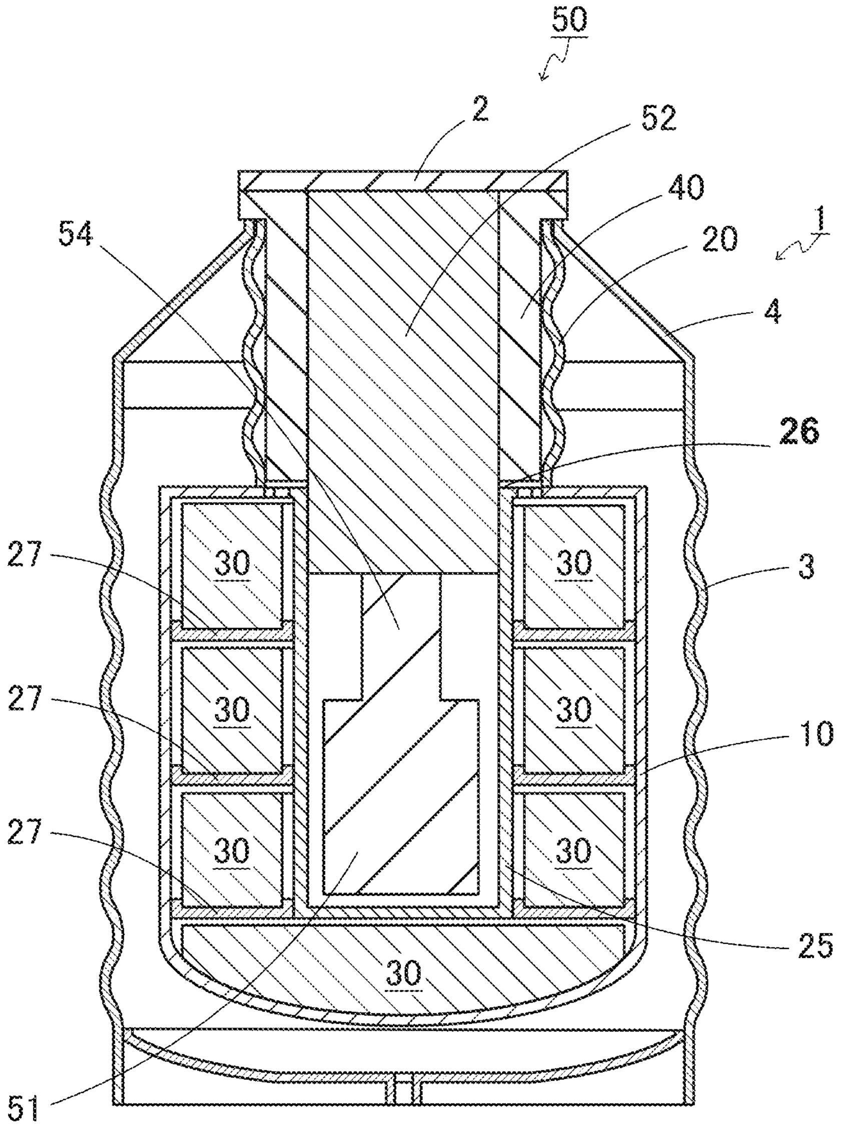
FIG. 3 is a longitudinal cross-sectional view of the vacuum heat insulating double walled container in a state in which the workpiece carrier is attached. (embodiment)

As shown in FIGS. 1, 2, and 3, a vacuum heat insulating double walled container 1 includes an outer container 3 having an opening at an upper end portion, an inner container 10 having an opening at an upper end portion disposed in the outer container 3. In the inner container 10, a plurality of adsorbent blocks 30, a storage container 25, and a connecting tube 20 connecting the outer container 3 and the inner container 10 are provided. An annular cylindrical portion for supporting the outer container 3 upright and a bottom plate portion for sealing the inside of the outer container 3 are formed in a bottom portion 6 of the outer container 3. The bottom plate portion is formed in a curved shape protruding outwardly in a curved manner, and a vacuum suction portion 34 is formed at a desired portion of the bottom plate portion. By connecting a vacuum suction machine to the vacuum suction unit 34, it is possible to make a space 21 between the outer container 3 and the inner container 10 in a vacuum state.

The lower end portion of an outer lid 4 having a frustoconical shape with an opening at a central portion is fixed to the upper end portion of the outer container 3 by the fixing portion 45, and the lower end portion of the outer lid 4 and the upper end portion of the outer container 3 are integrally fixed by the fixed portion 45 by welding, brazing, bonding, or the like. Further, the bottom portion 6 is provided at the lower end portion of the outer container 3. The bottom portion 6 includes an annular support portion extended downward from the outer peripheral surface of the outer container 3 and a bottom surface portion covering the bottom surface of the outer container 3. The bottom surface portion is formed in a curved shape protruding outwardly in a curved manner, and the annular support portion and the bottom surface portion are integrally fixed by the fixing portion 45.

An annular inner lid 11 having an opening at a central portion thereof is fixed to the upper end portion of the inner container 10 by the fixing portion 45, and the inner lid 11 and the upper end portion of the inner container 10 are integrally fixed by the fixing portion 45 by welding, brazing, bonding, or the like. A bottom portion 12 of the inner container 10 is integrally molded by drawing or the like, and is formed in a curved shape protruding outwardly in a curved manner. The bottom surface portion of the outer container 3 and the bottom portion 12 of the inner container 10 are formed in a curved shape protruding in the same direction to increase the surface strength when the space 21 is in a vacuum state.

Although it is not shown, it is possible to wind a thin aluminum plate around the inner container 10 so as to cover the entire outer peripheral surface thereof. The thin aluminum plate may have a flat smooth surface or a rough surface such as wrinkling, mat finishing, or embossing scribing.

The upper end portion and the lower end portion of the connecting tube 20 are integrally fixed to the opening edge of the upper end portion of the outer lid 4 and the inner peripheral edge of the inner lid 11, respectively, by the fixing portion 45. The space 21 surrounded by the outer lid 4, the outer container 3, the inner container 10, and the connecting tube 20 is configured as a sealed space.

The peripheral surface of the connecting tube 20 can be formed in an uneven shape using a thin metal. Such a configuration improves the surface strength of the connecting tube 20 even if it is configured using a thin metal. While the connecting tube 20 may be configured using a thick pipe material in order to increase its surface strength, the thermal conductivity of the connecting tube 20 increases as the weight of the connecting tube 20 is increased.

Therefore, in order to reduce the weight of the connecting tube 20 and increase the surface strength, it is desirable to form the peripheral surface in an uneven shape using a thin metal. By using the connecting tube 20 formed in this manner, the inner container 10 can be firmly supported by and fixed to the outer container 4.

The outer container 3 and the inner container 10 are configured using a thin metal material, and the outer container 3, the inner container 10, and the connecting tube 20 are configured using aluminum, an aluminum alloy, or stainless steel. The outer container 3 and the inner container 10 may be configured using a thin material having high physical strength and high heat strength. The connecting tube 20 may be configured using a metal material, such as a zinc alloy, or a tin alloy, or the like having lower thermal conductivity than aluminum, an aluminum alloy, or stainless steel; a heat-resistant magnesium alloy; or the like. When the outer container 3 and the inner container 10 are configured using a thin material having high physical strength and high heat strength, the connecting tube 20 may be configured using the same material as the outer container 3 and the inner container 10.

[Configuration of Storage Container and Adsorbent Block]

In the inner container 10, a bottomed storage container 25 made of metal and having an open upper end is stored in a state of being separated from the inner surface of the inner container 10. A plurality of adsorbent blocks 30 is disposed on the bottom surface and the outer peripheral surface of the storage container 25, and the storage container 25 is supported by the adsorbent block 30 disposed between the bottom surface of the storage container 25 and the bottom portion 12 of the inner container 10.

Figure 4:
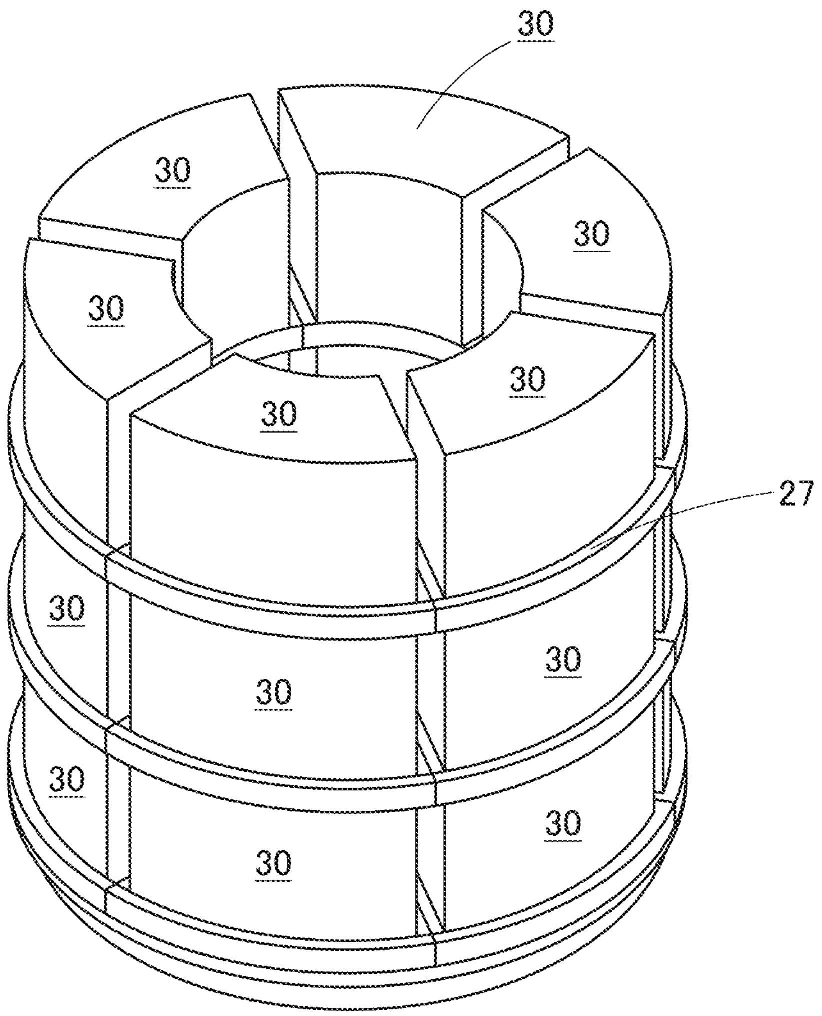
FIG. 4 is a perspective view of a main part of stacked adsorbent blocks. (embodiment)
Figure 5:
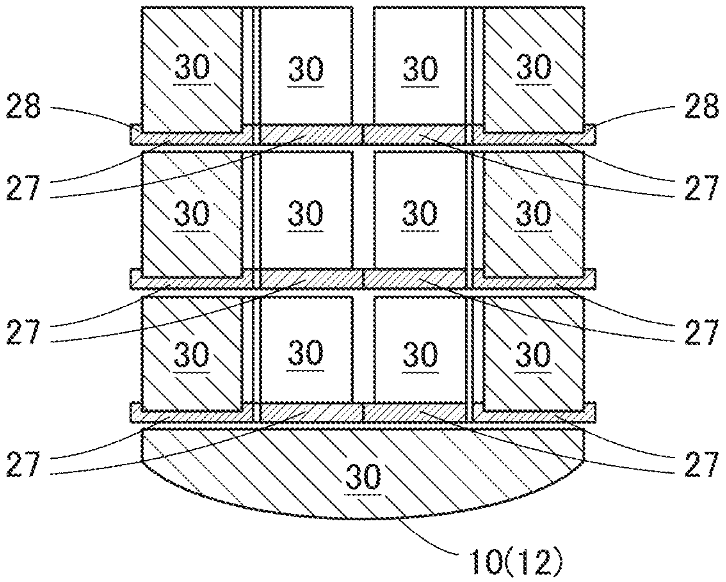
FIG. 5 is a longitudinal cross-sectional view of FIG. 4. (embodiment)
Figure 6:
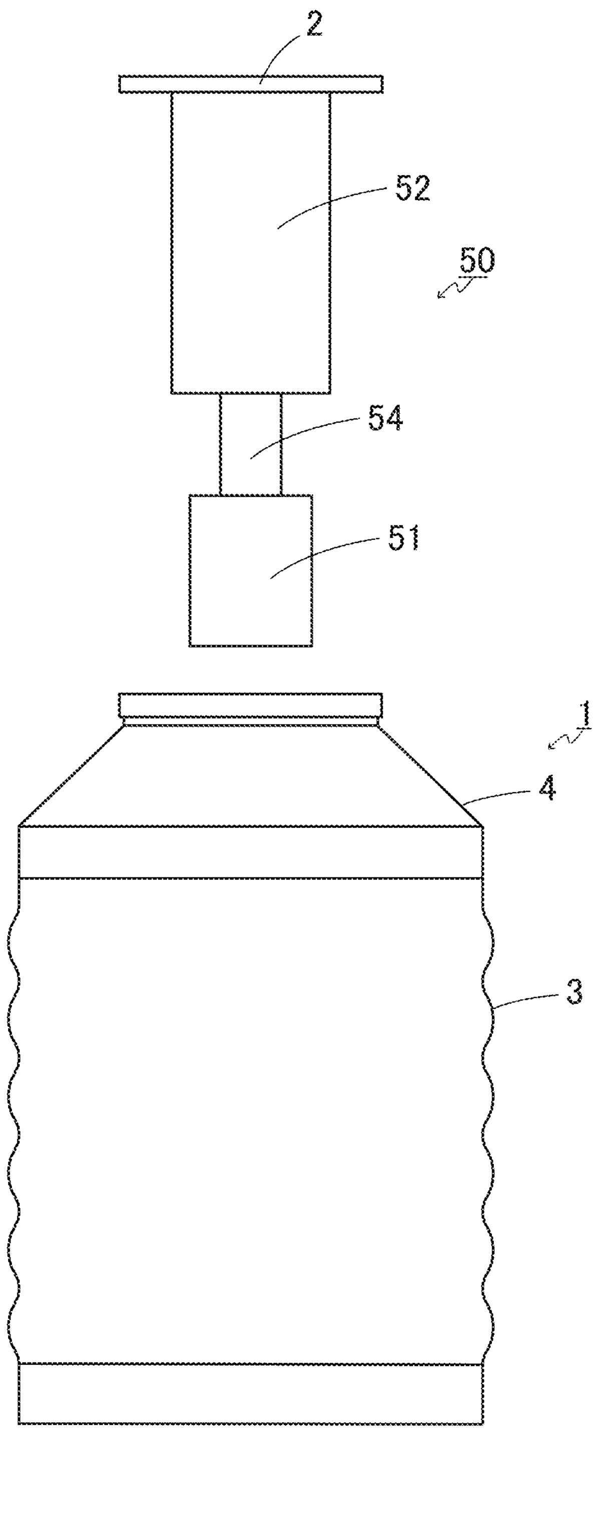
FIG. 6 is a front view of a workpiece carrier and a vacuum heat insulating double walled container. (embodiment)

A plurality of partition plates 27 protruding toward the inner peripheral surface side of the inner container 10 stood from the outer peripheral surface of the storage container 25, and the partition plates 27 are arranged in parallel in a state of being separated from one another along the longitudinal direction of the storage container 25. As shown in FIGS. 3, 4, and 5, the distal end of the partition plate 27 is formed with an upwardly refracted stopper piece 28, which positions the adsorbent block 30 placed on the partition plate 27 and restricts the movement of the adsorbent block 30 on the partition plate 27.

The partition plate 27 is configured using aluminum, an aluminum alloy or stainless steel in the same manner as the storage container 25. The partition plate 27 can be integrally fixed to the outer peripheral surface of the storage container 25 by welding, brazing, or bonding. Further, although it is not shown, an aluminum foil may be wound around each of the adsorbent blocks 30 to form a partition plate 27 and a stopper piece 28. In this case, it is desirable to form an aluminum foil having an adsorption port for a cryogenic low-temperature liquefied gas and being wound around each of the adsorbent blocks 30, so that the cryogenic low-temperature liquefied gas supplied to the adsorbent block 30 can be adsorbed. When the outer container 3 and the inner container 10 are configured using a thin material having high physical strength and high heat strength, the partition plate 27 can be configured using the same material as that of the storage container 25.

Although it is not shown, the outer peripheral surface of the inner container 10 can be wound with a thin aluminum plate. This makes the outer peripheral surface of the inner container 10 made of metal to have a laminated structure with the metal, so that the radiant heat transferred from the outer peripheral surface of the inner container 10 can be minimized. Also when configuring the outer container 3 and the inner container 10 using a thin material having high physical strength and high heat strength, the outer peripheral surface of the inner container 10 can be wound with a thin aluminum plate.

While each of the adsorbent blocks 30 can be disposed in a state of being in close contact with the storage container 25, it is desirable to dispose each of the adsorbent blocks 30 in a state of not being in contact with the inner surface of the inner container 10, with using the stopper piece 28 of the partition plate 27 as shown in FIG. 5.

Such a configuration allows to form an air layer functioning as a heat insulating layer between each of the adsorbent blocks 30 disposed at the inner surface side of the inner container 10 and the inner peripheral surface of the inner container 10, so that the cold air of the cryogenic liquefied gas adsorbed on each of the adsorbent blocks 30 can be prevented from transferring to the inner container 10.

Figure 9A:
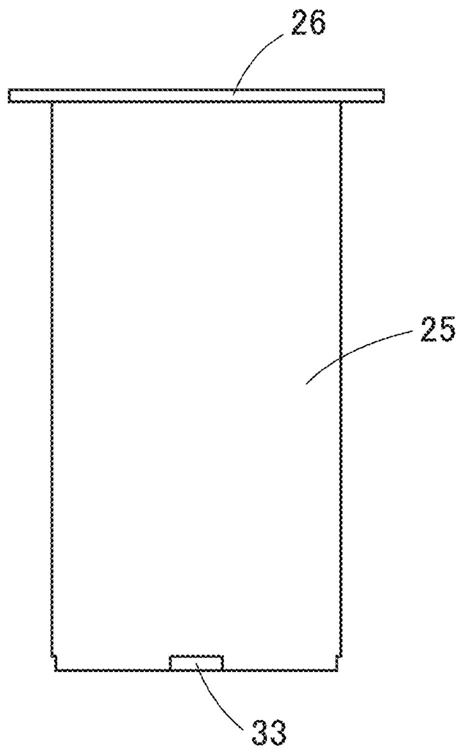
FIG. 9A is a front view of a storage container.
Figure 9B:
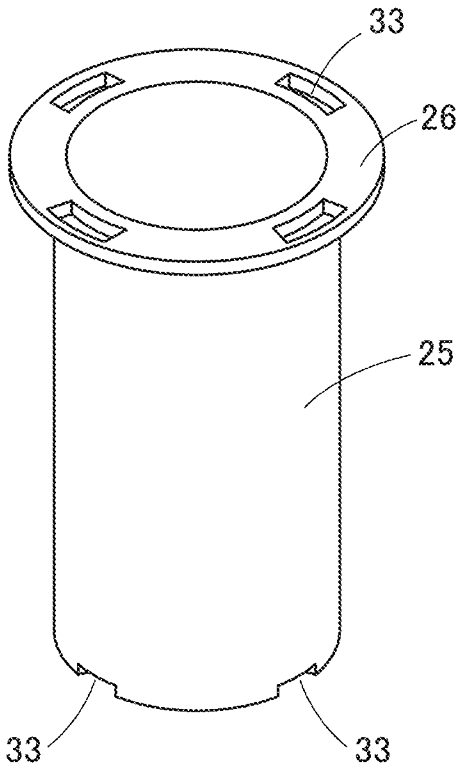
FIG. 9B is a perspective view of the storage container. (embodiment)

As shown in FIGS. 9A and 9B, the storage container 25 is formed in a bottomed cylindrical shape, and a ring-shaped upper surface cover plate 26 extending outwardly is provided at the opening of the upper end of the storage container 25. The upper surface cover plate 26 may be integrally formed by bending the upper end portion of the storage container 25, or may be fixed to the upper end portion of the storage container 25 by welding, brazing, or bonding. The upper cover plate 26 can cover the upper surface of the adsorbent block 30 placed on the partition plate 27.

Figure 10A:
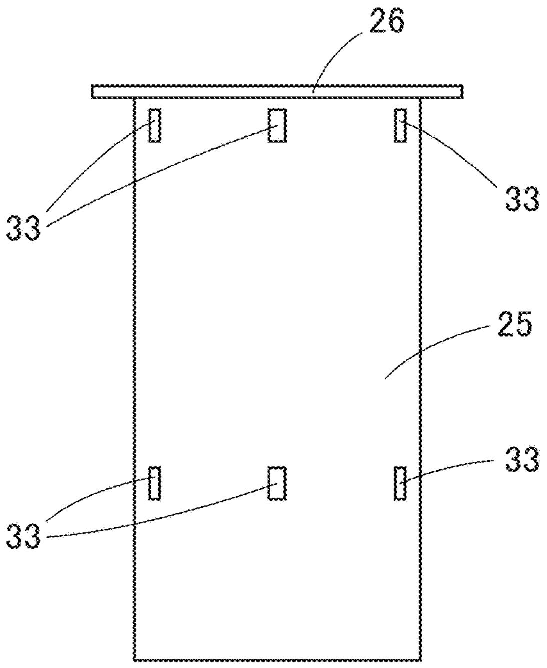
FIG. 10A is a front view of a storage container according to another configuration.
Figure 10B:
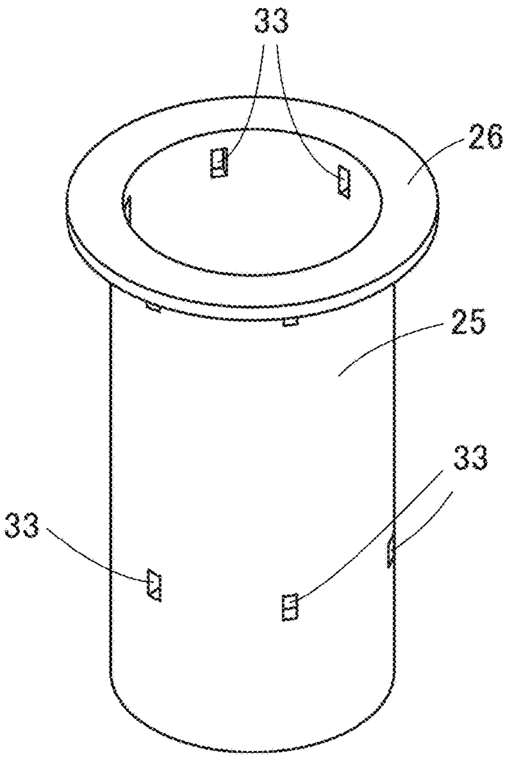
FIG. 10B is a perspective view of the storage container. (embodiment)
Figure 11:
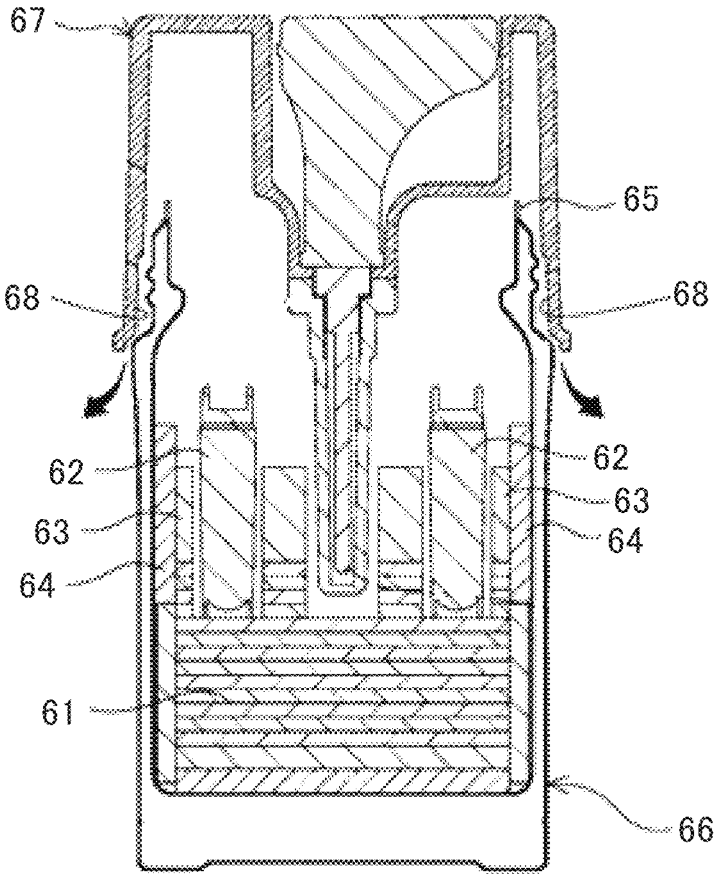
FIG. 11 PRIOR ART
FIG. 11 is a cross-sectional view of a biological sample transporting container. (conventional example 1)
Figure 12:
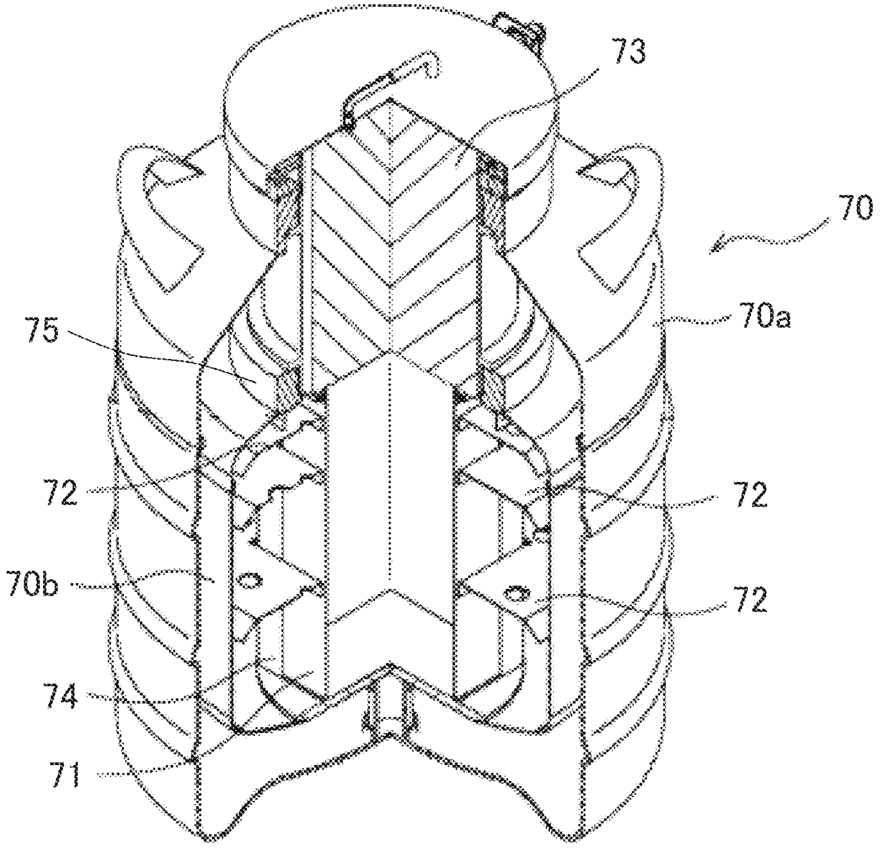
FIG. 12 PRIOR ART
FIG. 12 is a perspective view including a partial cross-section of a cryopreservation/transportation container. (conventional example 2)
Figure 13:
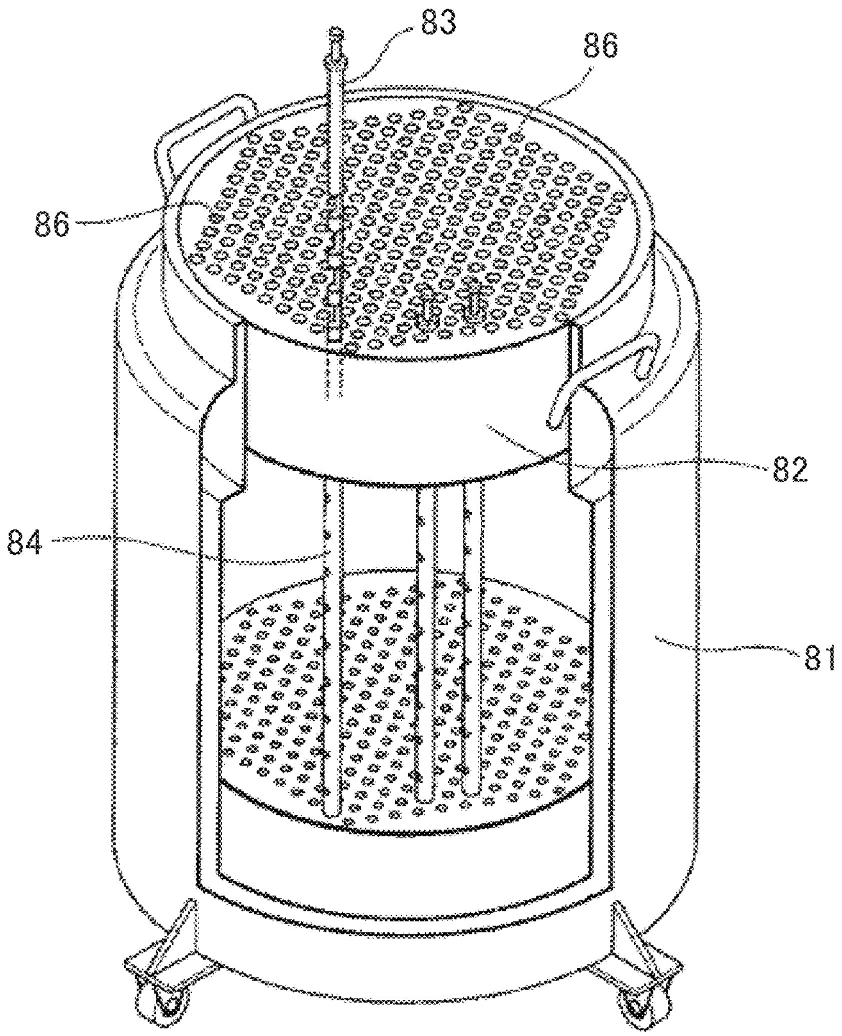
FIG. 13 PRIOR ART
FIG. 13 is a perspective view including a partial cross-section of a cryopreservation container. (conventional example 3)
Figure 14:
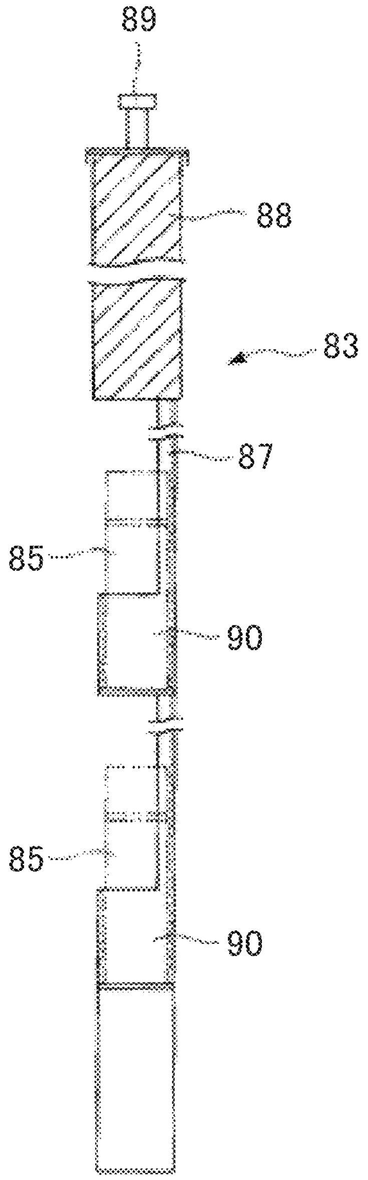
FIG. 14 PRIOR ART
FIG. 14 is an explanatory view showing an ampoule accommodating device. (conventional example 3)
Figure 15:
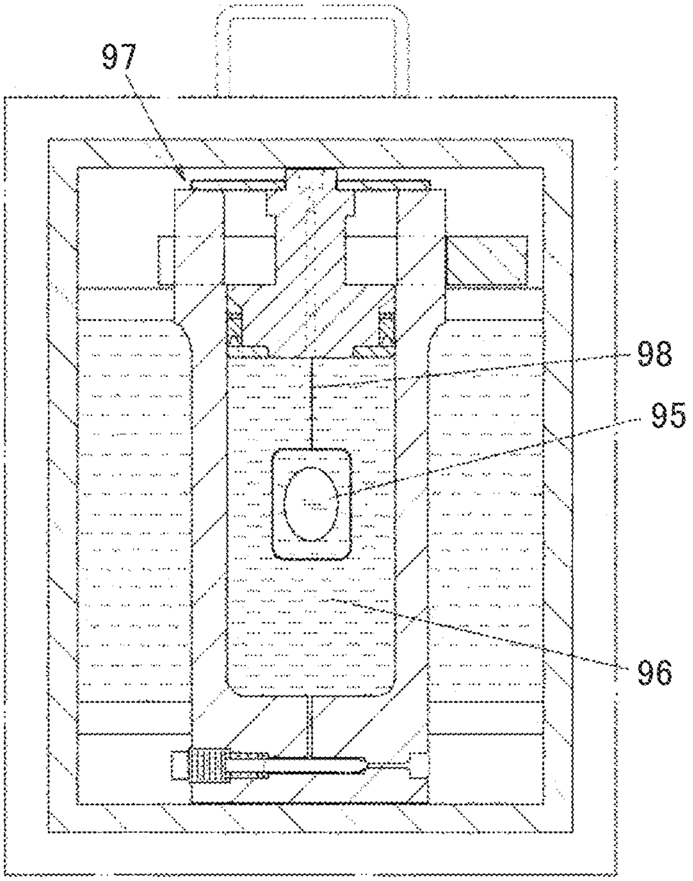
FIG. 15 PRIOR ART
FIG. 15 is a schematic explanatory cross-sectional view of a pressure holding vessel. (conventional example 4)

As shown in FIGS. 9A and 9B, a plurality of intake/exhaust ports 33 for the cryogenic liquefied gas is formed on the upper surface cover plate 26 and the bottom surface of the storage container 25. As shown in FIGS. 10A and 10B, a plurality of intake/exhaust ports 33 may be formed on the side surface of the storage container 25. The intake/exhaust ports 33 may be formed at positions above one-third of the entire length of the storage container 25 and below one-third of the entire length of the storage container 25. In addition, when the intake/exhaust ports 33 are formed on the side surface of the storage container 25, it is desirable that each intake/exhaust ports 33 has an opening facing the upper end portion side of the adsorbent block 30 on the partition plate 27.

As the adsorbent used in the adsorbent block 30, any suitable material can be used as long as it is capable of adsorbing a cryogenic liquefied gas. Examples of the adsorbent include zeolite, activated carbon, oil sorbent, and glass wool.

As shown in FIGS. 3 to 5, a plurality of adsorbent blocks 30 is disposed so as to cover the bottom surface side and the side surface side of the storage container 25. The plurality of adsorbent blocks 30 disposed at the bottom surface side and the side surface side of the storage container 25 is arranged with an equal interval in the circumferential direction and that in the vertical direction. By disposing the adsorbent blocks 30 in this manner, it is possible to uniformly cool the storage container 25 in a state in which the cryogenic low-temperature liquefied gas is adsorbed on each of the adsorbent blocks 30.

[Configuration of Heat Insulating Tube]

Figure 7:
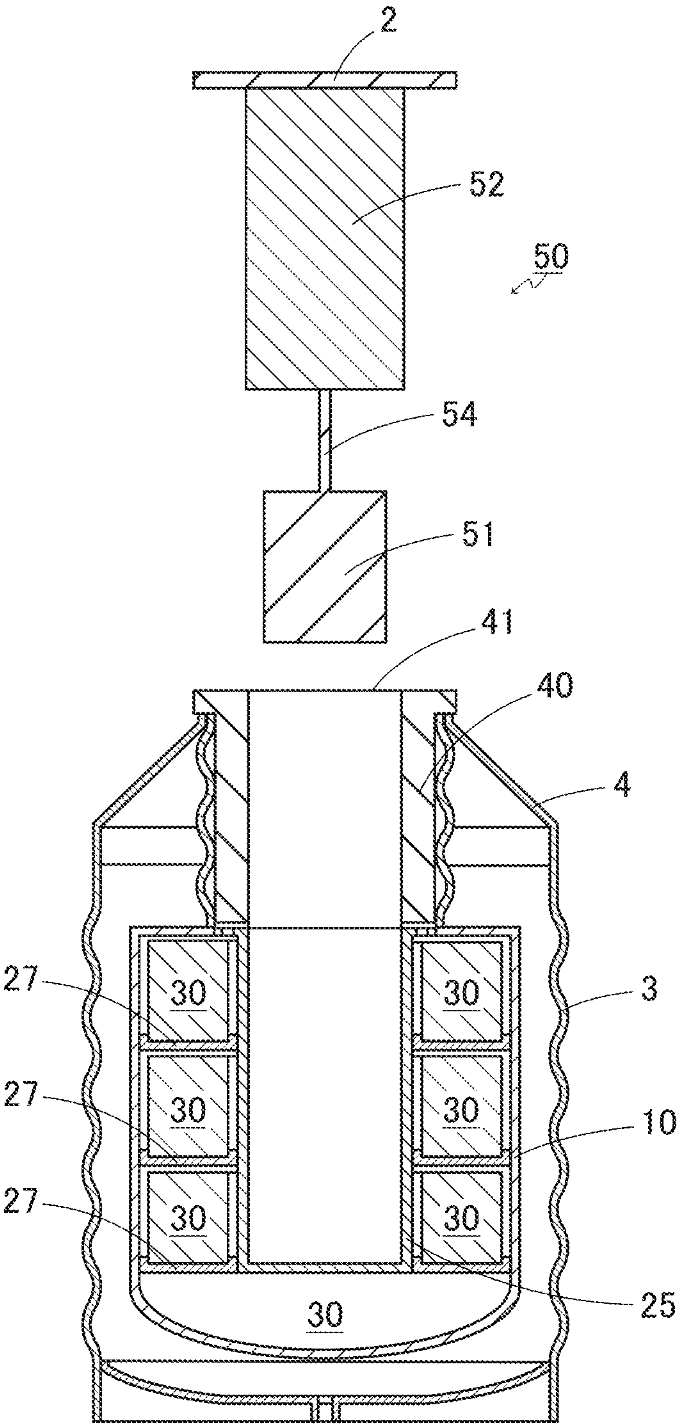
FIG. 7 is a longitudinal cross-sectional view of FIG. 6. (embodiment)
Figure 8:
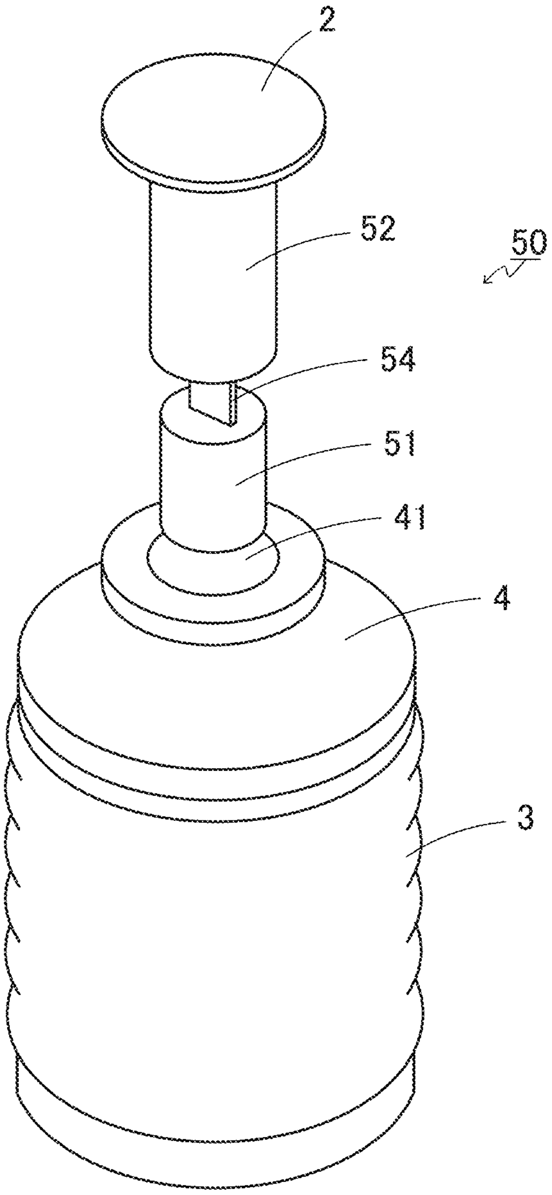
FIG. 8 is a perspective view of a workpiece carrier and a vacuum heat insulating double walled container as a fixing device. (embodiment)

As shown in FIGS. 3 and 7, a heat insulating tube 40 made of a foamed resin may be provided so as to cover the entire inner surface of the connecting tube 20. As a result, transferring the cold air in the storage container 25 to the connecting tube 20 is prevented. Further, a flange portion is formed at the upper end portion of the heat insulating tube 40 so that it is possible to place and fix the lid 2 of the workpiece carrier 50 to be described below in an openable/closable manner. As to the fixation between the flange portion of the heat insulating tube 40 and the lid 2 of the workpiece carrier 50, the upper surface of the lid 2 and the lower surface of the flange portion may be fixed by sandwiching them with a clip member or by screwing them. Other known fixing methods can also be used.

In the configuration of the storage container 25 shown in FIGS. 9A and 9B, a gap for flowing a cryogenic liquefied gas can be formed between the lower end portion of the heat insulating tube 40 (shown in FIGS. 3 and 7) and the upper end portion of the storage container 25. Further, in the configuration of the storage container 25 shown in FIGS. 10A and 10B, the lower end portion of the heat insulating tube 40 (shown in FIGS. 3 and 7) and the upper end portion of the storage container 25 can be in close contact.

[Configuration as Fixing Device]

As shown in FIGS. 3 and 6 to 8, a workpiece carrier 50 for inserting and supporting a sample into the storage container 25 is used. The workpiece carrier 50 is used for holding a sample in a cryogenic state in the storage container 25. The workpiece carrier 50 is provided with the lid 2, a carrier guide 52 attached to the lower surface of the lid 2, a plate-like portion 54 downwardly attached to the lower surface of the carrier guide 52, and a workpiece storage portion 51 provided at the lower end of the plate-like portion 54.

The lid 2 is detachable from the flange portion provided at the upper end portion of the heat insulating tube 40, and the upper surface of the lid 2 and the lower surface of the flange portion may be sandwiched with a clip in a pressure contact state. As the detachable configuration between the upper surface of the lid 2 and the flange portion, a threaded portion may be formed between the opposing surfaces between the lid 2 and the flange portion.

When the workpiece carrier 50 is fitted in the vacuum heat insulating double walled container 1, the outer peripheral surface of the carrier guide 52 can be in close contact with the inner surface of the heat insulating tube 40 as well as with the upper end portion side of the storage container 25. As a result, the inside of the storage container 25 covered with the carrier guide 52 can be maintained in a sealed state. The cryogenic liquefied gas vaporized from the adsorbent block 30 passes through the heat insulating tube 40 and the carrier guide 52 to be exhausted to the outside, so that the inside of the inner container 10 can be prevented from becoming a high-pressure state due the vaporized very low-temperature liquefied gas.

The plate-like portion 54 is formed of a plate-like member having a predetermined width, and the plate-like portion 54 together with the workpiece storage portion 51 are disposed in a non-contact state with the storage container 25. Even if an external force acts on the vacuum insulation double walled container 1 to vibrates the vacuum insulation double walled container 1, the plate-like portion 54 can absorb vibration with its long rectangular cross-section, so that the workpiece storage portion 51 disposed at the lower end portion of the plate-like portion 54 can be prevented from being vibrated.

The workpiece storage portion 51 is configured to have a storage space for storing a sample to be stored in the vacuum heat insulating double walled container 1. The lid 2, the carrier guide 52, the plate-like portion 54, and the workpiece storage portion 51, which constitute the workpiece carrier 50, can be configured using a synthetic resin having high heat insulating properties. The lid 2 and the plate-like portion 54 may be configured using a resin material having rigidity.

Thereby, even if the vacuum heat insulating double walled container 1 vibrates, by the heat insulating tube 40 and the carrier guide 52 that supports the plate-like portion 54, transmitting the vibration of the vacuum heat insulating double walled container 1 to the plate-like portion 54 and workpiece storage portion 51 is prevented.

[Sample Stored in Vacuum Heat Insulating Double Container 1, Cryogenic Liquefied Gas]

As a sample to be stored in the vacuum heat insulating double walled container 1, a sample that needs to be stored and transported in a frozen sample transport container, in particular in a medical industry or a research institute, can be used, or a sample which needs to be transported at a temperature below freezing point can be used. Examples of the sample include tissues and cells of humans, animals, and plants, biological structures, and artificial biological structures such as cultured cells. The vacuum heat insulating double walled container 1 of the present invention can be used as a container for transporting a sample that needs to be transported while maintaining in a low temperature state.

As a cryogenic low-temperature liquefied gas to be adsorbed on the adsorbent block 30, one depending on the situation of the sample to be stored in the vacuum heat insulating double walled container 1 and to be transported can be used. Examples of the cryogenic low-temperature liquefied gas include liquid nitrogen, liquid helium, liquefied argon, liquefied oxygen, and liquefied carbon dioxide gas, and can be appropriately selected depending on the situation of the sample to be transported in a frozen state.

[Assembly]

With reference to FIG. 3, the adsorbent blocks 30 are respectively disposed on a plurality of partition plates 27 fixed to the sample storage container 25, and the upper surface cover plate 26 is integrally fixed to the upper end portion of the sample storage container 25. After the upper surface cover plate 26 is integrally fixed to the upper end portion of the sample storage container 25, the adsorbent blocks 30 may be disposed on the plurality of partition plates 27, respectively.

Next, the adsorbent blocks 30 are placed on the bottom portion 12 of the inner container 10 before the inner lid 11 is fixed thereto, and the sample storage container 25 provided with the adsorbent blocks 30 at the peripheral surface thereof and having the upper surface cover plate 26 is placed in the inner container 10. Then, the sample storage container 25 is positioned and placed on the adsorbent block 30 placed on the bottom portion 12 of the inner container 10.

The peripheral edge of the lower end portion of the connecting tube 20 is integrally fixed to the inner peripheral edge of the inner lid 11, and the inner lid 11 is integrally fixed to the inner container 10. Next, the peripheral edge of the upper end portion of the connecting tube 20 is integrally fixed to the opening edge 5 at the upper end portion of the outer lid 4 and the lower end edge of the outer lid 4 is integrally fixed to the upper end outer peripheral edge of the outer container 3.

Thereafter, the heat insulating tube 40 is inserted so as to be in close contact with the inner peripheral surface of the connecting tube 20 and the upper end portion of the sample storage container 25. The heat insulating tube 40 may be inserted before the connecting tube 20 is fixed to the inner lid 11.

Next, the lid 2 provided with the workpiece storage portion 51, the plate-like portion 54, and the workpiece carrier 50 are inserted into the heat insulating tube 40, and the lid 2 is detachably fixed to the flange portion formed at the upper end portion of the heat insulating tube 40, thereby completing the vacuum heat insulating double walled container 1 provided with the workpiece carrier 50.

When the sample is stored in the vacuum heat insulating double walled container 1, the workpiece carrier 50 is temporary detached from the vacuum heat insulating double walled container 1, and the cryogenic low-temperature liquefied gas is injected through the inner peripheral surface of the heat insulating tube 40 as a passage. When the sample storage container 25 is configured as in FIGS. 9A and 9B, the injected cryogenic liquefied gas passes through the gap between the lower end portion of the heat insulating tube 40 and the upper end portion of the sample storage container 25 and is injected into each of the adsorbent blocks 30 from the plurality of intake/exhaust ports 33 formed on the upper surface cover plate 26 and the intake/exhaust port 33 formed on the bottom surface of the sample storage container 25.

When the sample storage container 25 is configured as in FIGS. 10A and 10B, the cryogenic low-temperature liquefied gas is injected into each of the adsorbent blocks 30 from the plurality of intake/exhaust ports 33 formed on the peripheral surface of the sample storage container 25. At this time, it is desirable to form the intake/exhaust port 33 formed on the peripheral surface of the sample storage container 25 at positions corresponding to the upper end portion sides of the adsorbent blocks 30 placed on the partition plates 27. Further, if necessary, the intake/exhaust port 33 may be formed on the bottom surface portion besides the peripheral surface of the sample storage container 25.

In this manner, the adsorbent blocks 30 are configured in block, where each of the adsorbent blocks 30 disposed on the peripheral surface of the sample storage container 25 is placed on the partition plate 27, and the plurality of intake/exhaust ports 33 is formed at positions corresponding to the positions of the adsorbent blocks 30. Such a configuration allows to set the adsorption amount of the cryogenic low-temperature liquefied gas to an appropriate adsorption amount.

[Effect]

In the vacuum heat insulating double walled container 1 according to the present invention, in addition to the vacuum structure, the adsorbent blocks 30 are formed in block, and moreover, each of the adsorbent blocks 30 disposed on the peripheral surface of the sample storage container 25 is placed on the partition plate 27. Moreover, the inner container 10 is hung in the outer container 3 using the connecting tube 20 formed of a thin material having an uneven outer peripheral surface. In addition, the heat insulating tube 40 is disposed on the inner surface of the connecting tube 20, and when the workpiece carrier 50 is fitted and fixed in the vacuum heat insulating double walled container 1, the inside of the inner container 10 can be maintained in an airtight state.

Moreover, such a configuration allows to suppress an amount of heat transferred from the inner container 10 to the outside through the outer container 3. In addition, since each of the adsorption blocks 30 disposed on the peripheral surface of the sample storage container 25 is placed on the partition plate 27 in a state of being separated from one another in the vertical direction, an appropriate amount of adsorption of cryogenic liquefied gas can be obtained. When the aluminum foil is wound around each of the adsorbent blocks 30 to form the partition plate 27 and the stopper piece 28, since the aluminum foil is interposed at least between the adsorbent blocks 30 adjacent to each other in the vertical direction, the interposed aluminum foil functions as the partition plate 27.

Further, even if the cryogenic liquefied gas is vaporized from each of the adsorption blocks 30, the adsorption concentration of the cryogenic liquefied gas decreases from the upper end portion side of each of the adsorption blocks 30 individually, so that the entire surface of the sample storage container 25 can be maintained in a substantially uniform state.

In contrast, when a plurality of adsorption blocks adjacent to each other in the vertical direction is disposed in a state of directly stacking without interposing a partition plate therebetween as in the prior art, the adsorption concentration of the cryogenic liquefied gas decreases from the upper end portion side of the stacked adsorption blocks. Thus, the adsorption concentration of the cryogenic liquefied gas decreases from the upper end portion side of the sample storage container, and the entire surface of the sample storage container cannot be maintained in a uniform state.

By winding the outer peripheral surface of the inner container 10 with a thin aluminum plate, the outer peripheral surface of the inner container 10 can be configured as a laminate structure of metal, and the radiant heat transfer from the outer peripheral surface of the inner container 10 can be minimized.

As shown in FIG. 5, each adsorbent block 30 can be disposed in a state not being in contact with the inner surface of the inner container 10 by the stopper pieces 28 of the partition plate 27. Such a configuration can form an air layer functioning as a heat insulating layer between each adsorbent block 30 disposed at the inner surface side of the inner container 10 and the inner peripheral surface of the inner container 10, and prevent the cold air of the cryogenic liquefied gas adsorbed on each adsorbent block 30 from transferring to the inner container 10.

In addition, when a plurality of adsorption blocks adjacent to each other in the vertical direction is disposed in a stacked state without interposing a partition plate therebetween as in the prior art, the adsorption concentration of the cryogenic liquefied gas vaporized from the stacked adsorption blocks decreases from the upper end portion side of the stacked adsorption blocks. Thus, cooling cannot be performed from the upper end portion side of the sample storage container, so that the entire surface of the sample storage container cannot be maintained in a uniform state.

In contrast, in the present invention, even if the vaporization of the cryogenic liquefied gas progresses from each adsorption block 30, the adsorption concentration of the cryogenic liquefied gas decreases individually from the upper end portion side of each adsorption block 30, so that the entire surface of the sample container 25 can be maintained in a substantially uniform state.

The workpiece carrier 50 as a fixing device can maintain the inside of the inner container 10 in a sealed state by the carrier guide 52 that closely contacts with the heat insulating tube 40 provided at the inner peripheral surface of the connecting tube 20. In addition, the lid 2 and the carrier guide 52 can be configured to be in close contact with the heat insulating tube 40 made of a synthetic resin such as a foam resin or the like, and the plate-like portion 54 provided at the lower end portion of the carrier guide 52 and the workpiece storage portion 51 provided at the lower end portion of the plate-like portion 54 are disposed in a non-contact state with respect to the sample storage container 25. Such a configuration allows vibration and impact less likely to be applied to the sample in the workpiece storage portion 51, even if an external force such as an impact or the like is applied to the vacuum heat insulating double walled container 1.

REFERENCE SIGNS LIST

1: vacuum heat insulating double walled container
2: lid
3: outer container
4: outer lid
6: bottom portion
10: container
11: inner lid
12: bottom portion
20: connecting tube
21: space
25: storage container
27: partition plate
30: adsorbent block
33: intake/exhaust port
34: vacuum suction portion
40: heat insulating tube
50: workpiece carrier
51: workpiece storage portion
52: career guide
54: plate-like portion
61: cryogenic liquefied gas adsorption-holding agent
62: sample container
63: sample container fixture
64: content fixture

66: container main body
67: lid
70: heat insulating container
71: storage portion
72: sloshing suppressing plate
74: plate-like member
75: fixing and connecting member
81: container main body
82: cap
83: ampoule accommodating device
84: sheath tube
87: support column
88: heat insulating portion
90: ampoule accommodating portion
97: pressure holding vessel
98: biological structure holder

The invention claimed is:

1. A vacuum heat insulating double walled container comprising:

an outer container;

an inner container disposed in the outer container in a separated state from the outer container;

a storage container that is a bottomed storage container having an open upper end and disposed in the inner container in a state of being separated from an inner surface of the inner container;

an inner lid having an opening at a central portion thereof and being fixed to the inner container;

an outer lid having an opening at a central portion thereof and being fixed to the outer container;

a connecting tube configured to connect and fix an opening edge of the inner lid and an opening edge of the outer lid; and a fixing device removeably fitted and fixed in the vacuum heat insulating double walled container, wherein a sealed space is present between the outer container and the inner container, and the sealed space is in a vacuum state, wherein the fixing device comprises:

a lid detachably disposed with respect to an opening of the outer container and configured to cover the opening thereof and to prevent air from entering an inside of the inner container;

a carrier guide disposed on a lower surface of the lid of the fixing device;

a plate portion extended from a lower end portion of the carrier guide and having a rectangular cross-section; and a workpiece storage portion disposed on a lower end of the plate portion, wherein when the fixing device is fitted and fixed in the vacuum heat insulating double walled container, an outer peripheral surface of the carrier guide is configured to be in close contact with an inner surface of an upper end portion side of the storage container.

2. The vacuum heat insulating double walled container according to claim 1, wherein an outer peripheral surface of the connecting tube has an uneven shape.

3. The vacuum heat insulating double walled container according to claim 1, wherein the plate portion and the workpiece storage portion are in a non-contact state with the storage container.

4. The vacuum heat insulating double walled container according to claim 1, wherein the vacuum heat insulating double walled container further comprises a heat insulating tube that is disposed on a surface of the connecting tube, and the carrier guide of the fixing device is fitted in the heat insulating tube.

5. The fixing device according to claim 1.

* * * * *